J. H. STARR.
Bee Separator.
No. 49,314. Patented Aug. 8, 1865.
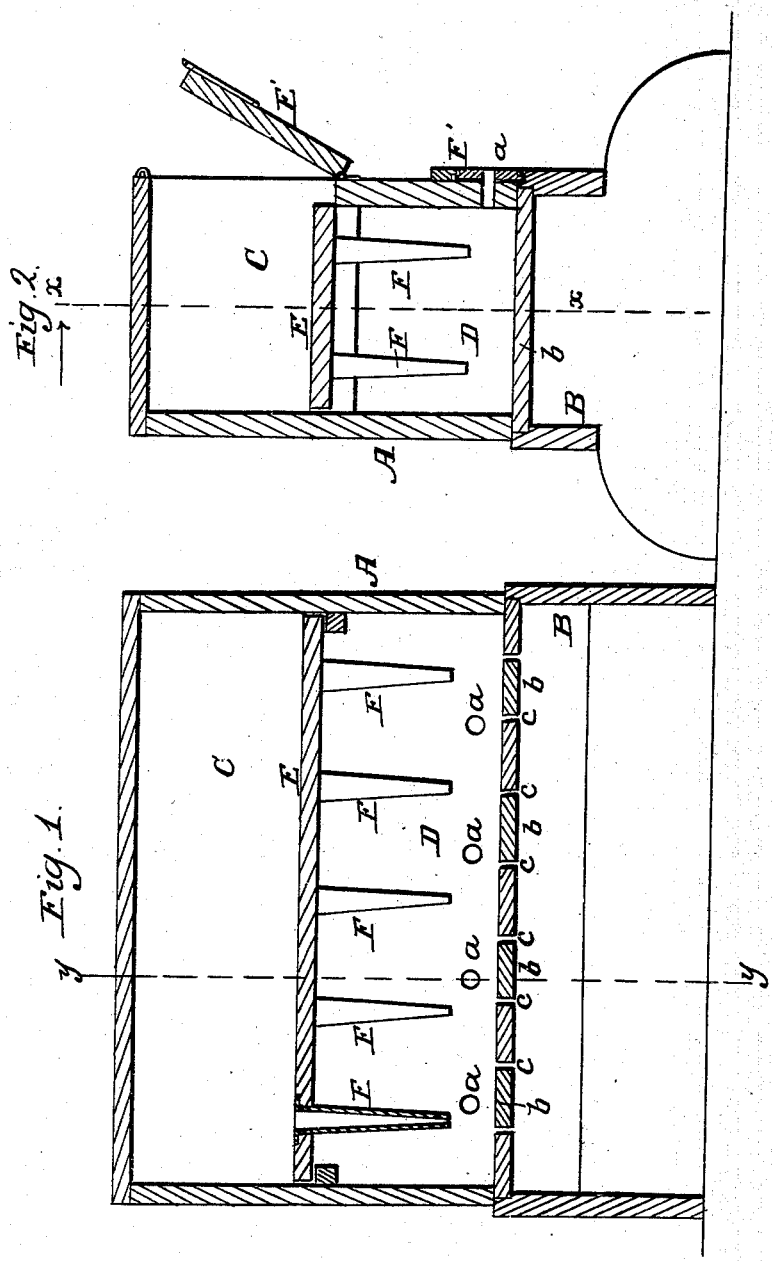

UNITED STATES PATENT OFFICE.

JESSE H. STARR, OF MIDDLEBUSH, NEW YORK.

IMPROVEMENT IN BEE-SEPARATORS.

Specification forming part of Letters Patent No. 49,314, dated August 8, 1865.

*To all whom it may concern:*

Be it known that I, J. H. STARR, of Middlebush, in the county of Schoharie and State of New York, have invented a new and Improved Bee-Separator; and I do hereby declare that the following is a full, clear, and exact description thereof, which will enable others skilled in the art to make and use the same, reference being had to the accompanying drawings, forming part of this specification, in which—

Figure 1 is a longitudinal vertical section of my invention, taken in the line $xx$, Fig. 2; Fig. 2, a transverse vertical section of the same, taken in the line $yy$, Fig. 1.

Similar letters of reference indicate like parts.

This invention relates to a new and improved device for separating bees from the honey contained in the caps or spare honey-receptacles placed in the hive.

Hitherto it has been somewhat difficult to get the bees out of these caps, and frequently the latter would be robbed of honey by bees of other hives—a difficulty fully obviated by my invention, which is constructed as follows:

I construct a box, A, of any suitable dimensions, according to the number of caps designed to be placed in it, and have a suitable base, B, to serve as a support for it. This box may be constructed of wood, and it is divided into two chambers, C D, by a horizontal partition, E, the latter having a series of vertical taper-pipes, F, fitted in it which extend down within the lower chamber, D, nearly to its lower end, and form the only communication between the upper and lower chambers. The upper chamber, C, is provided with a door, E', at one side, and in one side of the lower chamber, D, there are made a series of holes, $a$, which are covered by a perforated slide, F', by adjusting which the holes $a$ may be opened or closed. The bottom of the lower chamber, D, is formed of a series of slats, $b$, between which spaces are allowed for the admission of light and air into chamber D. The caps when taken from the hive are placed in the upper chamber, C, one over each pipe F, and the door E' being closed the bees, attracted by the light, will pass down the pipes F into the lower chamber, D, from whence they pass out through the holes $a$. The bees when out cannot return.

Thus by this simple means the bees may be separated from the caps containing the spare honey, and without danger of the caps being robbed by bees of neighboring hives.

I claim as new and desire to secure by Letters Patent—

A bee-separator consisting of a box divided into two compartments, which are made to communicate with each other by means of taper-pipes, the lower compartment being provided with holes or apertures to admit of the exit of the bees, and all arranged substantially as and for the purpose specified.

J. H. STARR.

Witnesses:
C. WATSON,
ELIJAH EBNER.